(12) United States Patent
Park et al.

(10) Patent No.: US 10,179,977 B2
(45) Date of Patent: Jan. 15, 2019

(54) COATING COMPOSITION CAPABLE OF EMBODYING PAPER FEEL FOR FOOD PACKING PAPER

(71) Applicants: CJ Cheiljedang Corporation, Seoul (KR); SUNGBO Ink. Co., Ltd., Gyeonggi-do (KR)

(72) Inventors: Dong Hui Park, Daejeon (KR); Tae Kyung Yun, Seoul (KR); Kyoung Sik Cho, Seoul (KR); Kwang Soo Park, Gyeonggi-do (KR); Yong Il Lee, Gyeonggi-do (KR); Dong Il Kim, Gyeonggi-do (KR)

(73) Assignees: CJ CHEILJEDANG CORPORATION (KR); SUNGBO Ink. Co. (KR)

( * ) Notice: Subject to any disclaimer, the term of this patent is extended or adjusted under 35 U.S.C. 154(b) by 149 days.

(21) Appl. No.: 15/285,657

(22) Filed: Oct. 5, 2016

(65) Prior Publication Data
US 2017/0096777 A1    Apr. 6, 2017

(30) Foreign Application Priority Data
Oct. 6, 2015  (KR) .................. 10-2015-0140397

(51) Int. Cl.
| | | |
|---|---|---|
| *C09D 175/04* | (2006.01) | |
| *D21H 19/26* | (2006.01) | |
| *C09D 7/65* | (2018.01) | |
| *C09D 7/20* | (2018.01) | |
| *C09D 7/61* | (2018.01) | |
| *D21H 19/20* | (2006.01) | |
| *D21H 19/28* | (2006.01) | |
| *D21H 27/10* | (2006.01) | |
| *C09D 5/00* | (2006.01) | |
| *C08L 27/06* | (2006.01) | |
| *C08L 29/04* | (2006.01) | |
| *D21H 19/18* | (2006.01) | |
| *D21H 19/22* | (2006.01) | |

(52) U.S. Cl.
CPC .............. *D21H 19/26* (2013.01); *C08L 27/06* (2013.01); *C08L 29/04* (2013.01); *C09D 5/00* (2013.01); *C09D 7/20* (2018.01); *C09D 7/61* (2018.01); *C09D 7/65* (2018.01); *C09D 175/04* (2013.01); *D21H 19/18* (2013.01); *D21H 19/20* (2013.01); *D21H 19/22* (2013.01); *D21H 19/28* (2013.01); *D21H 27/10* (2013.01)

(58) Field of Classification Search
CPC ................................... C09D 175/04
See application file for complete search history.

(56) References Cited

U.S. PATENT DOCUMENTS 3,818,533 A * 6/1974 Scheuer

FOREIGN PATENT DOCUMENTS

KR         10-0666528 B        1/2007

* cited by examiner

*Primary Examiner* — Michael F Pepitone
(74) *Attorney, Agent, or Firm* — Adsero IP

(57) ABSTRACT

The present invention relates to a coating composition capable of embodying paper feel for food packing paper, comprising a resin mixture, additive and solvent, characterized in that said additive comprises 3 to 12% by weight of polyethylene-based wax.

10 Claims, 4 Drawing Sheets

COATING COMPOSITION CAPABLE OF EMBODYING PAPER FEEL FOR FOOD PACKING PAPER

RELATED APPLICATION

This application claims priority to Korean Application Serial No. 10-2015-0140397, filed on Oct. 6, 2015, the content of which is incorporated here by reference in its entirety.

TECHNICAL FIELD

The present invention relates to a coating composition capable of embodying paper feel for food packing paper, and more specifically relates to the coating composition for food packing paper which can resolve problems presented on the packing paper to which the feeling of the existing paper is imparted, such as safety, processabililty, price, etc., and can provide not only a visual sensation but also tactile sensation which the paper has.

BACKGROUND

Generally, a food packing paper consists of synthetic resin, and is widely used in packing various fruits, vegetables, raw meat and processed foods, etc.

The food packing papers include a bag, sachet, pouch, wrap, etc., which can be often found in grocery stores, and are referred to as flexible packing materials since they can hold and seal things with any sizes or forms. Such flexible packing materials are ones that make materials produced by a plastic film, or materials having flexibility such as a paper, an aluminium foil, fiber, etc. into the forms having plural-layers or multi-layers and then make them into an envelope or film form so as to adapt characteristics of contents.

Recently, as consumers seeking for natural-, organic-, environment friendly-materials, etc. are increased, packages having the various functionalities are developing by reflecting such trends in the flexible packing paper.

For example, Korean Patent No. 10-0666528 relates to an antimicrobial food packing paper and the process for preparing thereof, and more specifically relates to an antifungal food packing paper and the process for preparing thereof, which comprises using natural pulp as the paper material while adding a large amount of emulsion rosin sizing agent in the sheet paper process and raw paper-preparing process, wherein out-added sizing agent is added so as to reinforce a water-resistance, performing a pigment coating on one side of the raw paper to be an outer surface of the packing paper to reinforce the beauty of the appearance, and coating and then drying an antimicrobial solution wherein fine silver-nano particles are dispersed to form an uniform antimicrobial membrane so that a continuous sterilizing power is developed by the stabilized silver-nano particle, which is no-harmful to human body even the food is directly contacted with the food packing paper.

Further, in addition to the functionality as mentioned above, there were efforts to reflect said trend by imparting feelings that the paper has to the packing paper via finishing methods using a paper or paper-like material, or a matte coating liquid, and the like.

However, the packing papers which the feelings that the existing paper has are imparted have various disadvantages in view of safety, processability, price, etc., and thus they have disadvantages that they are not easy to practically apply and the efficiency thereof is lowered.

Specifically, in the prior art, one skilled in the art has used the finishing method which a paper/plastic film laminate or parchment paper is used as a paper or paper-like material, or which is coated by using a matte coating liquid. However, in the case of the paper/plastic film laminate, although the real paper is laminated on the outer-surface or in the middle of the plastic, there was problems of complicated finishing process and high price, and in the case of the parchment paper wherein the plastic film is manufactured by the same process as the paper, it had both the property of plastic film and paper feeling, but it had problems of high price and limited printing, and in the case of the finishing method which is coated by using the matte coating liquid, it visually imparted the matte effect of the paper, but there was a problem that it does not impart the tactile sensation of the paper.

Therefore, it is necessary to develop a coating composition capable of embodying a feel in the food packing paper which can solve the above-mentioned problems while also reflecting the recent trends.

Prior Art: Korean Patent No. 10-0666528 B1 (Publication Date: Jan. 19, 2007)

DISCLOSURE

Technical Problem

The inventors of the present application have researched to embody the paper feel to the existing food packing paper, we have found fact that a visual sensation like a paper as well as the tactile sensation can be imparted to the paper by adding polyethylene-based wax in order to impart the tactile sensation to an existing matte coating which is used for the purpose of impairing the matte effect to the surface, and completed the present invention.

Accordingly, the present invention has been made in view of the above-mentioned problems occurring in the prior art, and an object of the present invention is to provide a coating composition capable of embodying paper feel for food packing paper.

Technical Solution

To accomplish the above-mentioned object, according to the present invention, there is provided a coating composition capable of embodying paper feel for food packing paper, comprising a resin mixture, additive and solvent, characterized in that said additive comprises 3 to 12% by weight of polyethylene-based wax.

Advantageous Effects

According to the present invention, the coating composition of the present invention is useful for providing a food packing paper having an excellent paper feel such as safety, processability, economy, etc. over the packing paper to which the feeling that the existing paper has is imparted since the said composition is able to embody the visual sensation like a paper as well as the paper feel.

DESCRIPTION OF DRAWINGS

FIGS. 2A-2C represent a conventional food packing paper which embodied the paper feel, wherein FIG. 2A shows a paper/plastic film laminate (210) comprising a substrate layer (211), adhesive layer (212) and paper layer (213) from the bottom, FIG. 2B shows a parchment paper (220), and FIG. 2C shows a food packing paper (230) comprising a substrate layer (231), printing layer (232) and matte coating layer (233) formed with a matter coating liquid.

BEST MODE FOR INVENTION

Figure 1:
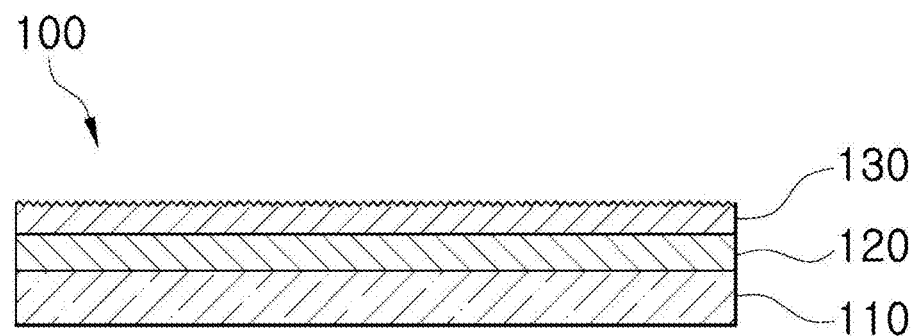
FIG. 1 is a side sectional view of the food packing paper (100) which is able to embody the paper feel of the present invention according to the preparation example 1, which comprises a substrate layer (110), printing layer (120) and coating layer (130) which can embody the paper feel, from the bottom.
Figure 2A:
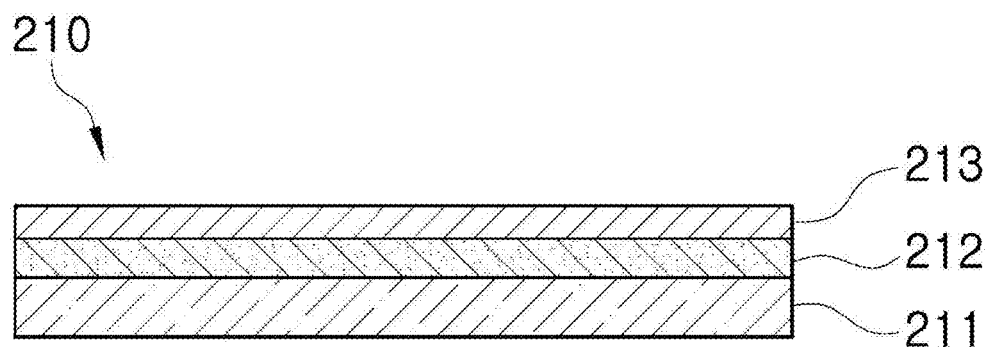
Figure 2B:
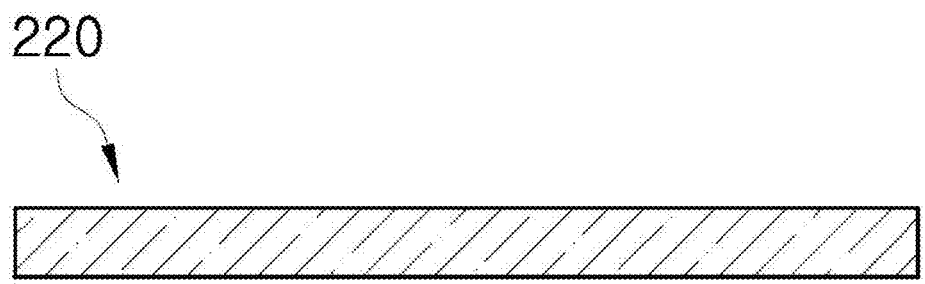
Figure 2C:
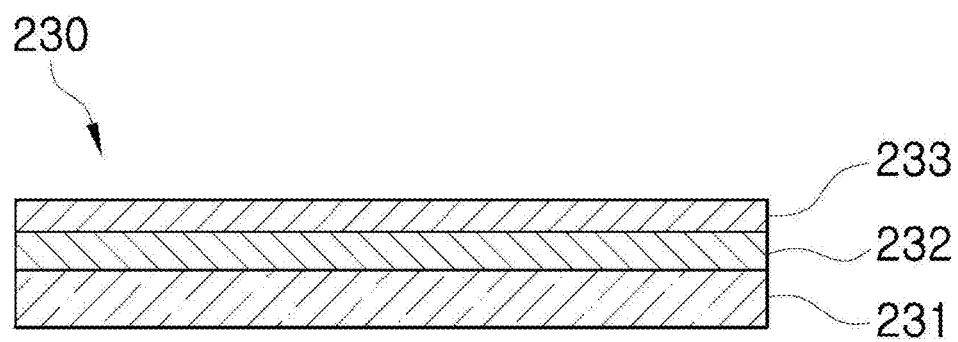

Hereinafter, an explanation on a coating composition according to the present invention will be described in detail.

As the first embodiment of the present invention, the present invention provides a coating composition for food packing paper, which can embody the paper feel, comprising a resin mixture, additive and solvent, characterized in that the additive comprises 3 to 12% by weight of polyethylene-based wax.

It is preferable that the said resin mixture is contained in an amount of 19.5 to 38% by weight, based on the total weight of the coating composition. The said resin mixture coats pigments sufficiently dispersed at the state having fluidity since it is dissolved in the solvent, separately from the particles, wherein the coating composition made by this is closely contacted with the subject side to be coated by adhesiveness that the said resin mixture has. If the content of said resin mixture is less than 19.5% by weight, the coating composition capable of embodying paper feel for the food packing paper is not closely contacted with the subject side to be coated, and thus the coating layer (130) can be cracked or peeled, and if the content of the resin mixture exceeds 38% by weight, there is a problem that the coating composition is easily coagulated and thus the coatability (coating ability) is lowered.

The said resin mixture may be a mixture of one or more species being selected from polyvinyl butyral, vinyl chloride-vinyl alcoholvinyl copolymer, acrylic polymer, polyurethane, rosin-modified maleic acid and polyester polyol.

Preferably, said resin mixture comprises 1 to 3% by weight of polyvinyl butyral, 1 to 5% by weight of vinyl chloride-vinyl alcoholvinyl copolymer, 1 to 3% by weight of acrylic polymer, 15 to 20% by weight of polyurethane, 1 to 5% by weight of rosin-modified maleic acid and 0.5 to 2% by weight of polyester polyol, based on the total weight of coating composition.

It is preferable that the said additive is contained in an amount of 4.9 to 19.5% by weight, based on the total weight of the coating composition.

Said additive may comprise polyethylene-based wax, silica gel, chlorinated polypropylene, anti-precipitating agent, and anti-foaming agent. Said polyethylene-based wax may be one or more species being selected from polyethylene wax and polytetrafluoroethylene wax.

Preferably, said additive may comprise 3 to 12% by weight of polyethylene-based wax, 1 to 5% by weight of silica gel, 0.5 to 1% by weight of chlorinated polypropylene, 0.2 to 0.5% by weight of anti-precipitating agent, and 0.2 to 1% by weight of anti-foaming agent, and more preferably said polyethylene-based wax may comprise 1 to 4% by weight of polyethylene wax, 2 to 8% by weight of polytetrafluoroethylene wax.

In the present invention, since the said polyethylene-based wax is contained in the coating composition in an amount of 3 to 12% by weight, a wear-resistance, slip-resistance, heat-resistance and paper feel can be embodied and also the phenomenon adhering on a guide roll and silicone roll which can be a problem in the lamination process (dry and T die) is solved. Also, if the polyethylene wax is used in an amount of less than 3% by weight, the paper feel cannot be embodied, and if it is used in an amount of exceeding 12% by weight, the tactile sensation of paper feel is improved but there is a problem that the coating precipitation is fast and thus the coating preserving ability is lowered.

It is preferable that the said solvent is contained in an amount of 43 to 75% by weight based on the total weight of the coating composition. The said solvent is that which the resin mixture is dissolved or diluted. If the content of the said solvent is less than 43% by weight, the coating process is not easy, and if the content of the said solvent exceeds 75% by weight, there is a problem that the coating quality is lowered.

In the present invention, one or more species being selected from ketone-based solvent, acetate-based solvent, alcohol-based solvent, and glycol ether-based solvent can be used as the said solvent. Preferably, said ketone-based solvent is methyl ethyl ketone, said acetate-based solvent is ethyl acetate, said alcohol-based solvent is isopropyl alcohol, and said glycol ether-based solvent is propylene glycol methyl ether.

More preferably, said solvent may comprise 15 to 30% by weight of methyl ethyl ketone, 20 to 33% by weight of ethyl acetate, 5 to 7% by weight of isopropyl alcohol, and 3 to 5% by weight of propylene glycol methyl ether.

The said coating composition of the present invention may comprise an anti-foaming agent, dispersing agent, labeling agent, diluents, slipping agent, plasticizer, coupling agent, ultraviolet-absorbing agent, dryer, etc, in order to improve the printing workability of the coating, and the printing effect, within the scope not impairing the desired function, if necessary.

The said coating composition according to the present invention comprises 1 to 3% by weight of polyvinyl butyral, 1 to 5% by weight of vinyl chloride-vinyl alcoholvinyl copolymer, 1 to 3% by weight of acrylic polymer, 15 to 20% by weight of polyurethane, 1 to 5% by weight of rosin-modified maleic acid and 0.5 to 2% by weight of polyester polyol as the resin mixture, and 1 to 4% by weight of polyethylene wax, 2 to 8% by weight of polytrafluoroethylene wax, 1 to 5% by weight of silica gel, 0.5 to 1% by weight of chlorinated polypropylene, 0.2 to 0.5% by weight of anti-precipitating agent and 0.2 to 1% by weight of anti-foaming agent as the additive, and comprises 15 to 30% by weight of methyl ethyl ketone, 20 to 33% by weight of ethyl acetate, 5 to 7% by weight of isopropyl alcohol, and 3 to 5% by weight of propylene glycol methyl ether.

Said coating composition may have 180 to 260 centistokes (cSt), preferably 192.4 to 251.6 cSt. If it is less than 180 cSt, the adhesiveness and binding force are low, and thus, the printing quality can be lowered, and if it exceeds 260 cSt, the viscosity is high and thus the coating process is not easy.

It is preferable that the particle size of said coating composition is 3 µm or less. If the particle size of the coating composition exceeds 3 μm, there is a problem that the coatability is lowered due to the particle size of the wax.

Hereinafter, the constitution of the present invention will be described in detail, and the following examples are only to illustrate the present invention, but the content of the present invention is not limited to the following examples.

EXAMPLE

Example 1: Preparation of the Coating Composition According to the Present Invention The present invention obtained a coating composition whose viscosity is 20±2 SEC (measured with RIGOSHA ZHAN CUP #4 at 25° C.) and whose mean particle size is 3 μm or less, by combining a resin mixture, additive and solvent in the component and content as described in the below Table 1.

TABLE 1

(Combination component and content of the coating composition of the present invention)

| | Constitutive components | Example 1 (% by weight) |
|---|---|---|
| Resin mixture | Polyvinyl butyral | 1 |
| | Vinyl chloride-Vinyl alcoholvinyl acetate copolymer | 1 |
| | Acryl polymer | 1 |
| | Polyurethane | 15 |
| | Rosin modified maleic acid | 1 |
| | Polyester polyol | 0.5 |
| Additives | Polyethylene wax | 1 |
| | Polytetrafluoroethylene (PTFE) wax | 5 |
| | Silica gel | 1 |
| | Chlorinated polypropylene (CPP) | 0.5 |
| | Antiprecipitating agent | 0.2 |
| | Antifoaming agent | 0.2 |
| Solvent | Methyl ethyl ketone (MEK) | 30 |
| | Ethyl acetate | 32.6 |
| | Isopropyl alcohol | 5 |
| | Propylene glycol methyl ether | 5 |

Preparation Example 1: Preparation of Food Packing Paper Embodying Paper Feel According to the Present Invention The preparation of food packing paper embodying the paper feel according to one example of the present invention produced the food packing paper embodying the paper feel by coating (dry lamination) of the coating composition prepared from Example 1.

Figure 3:
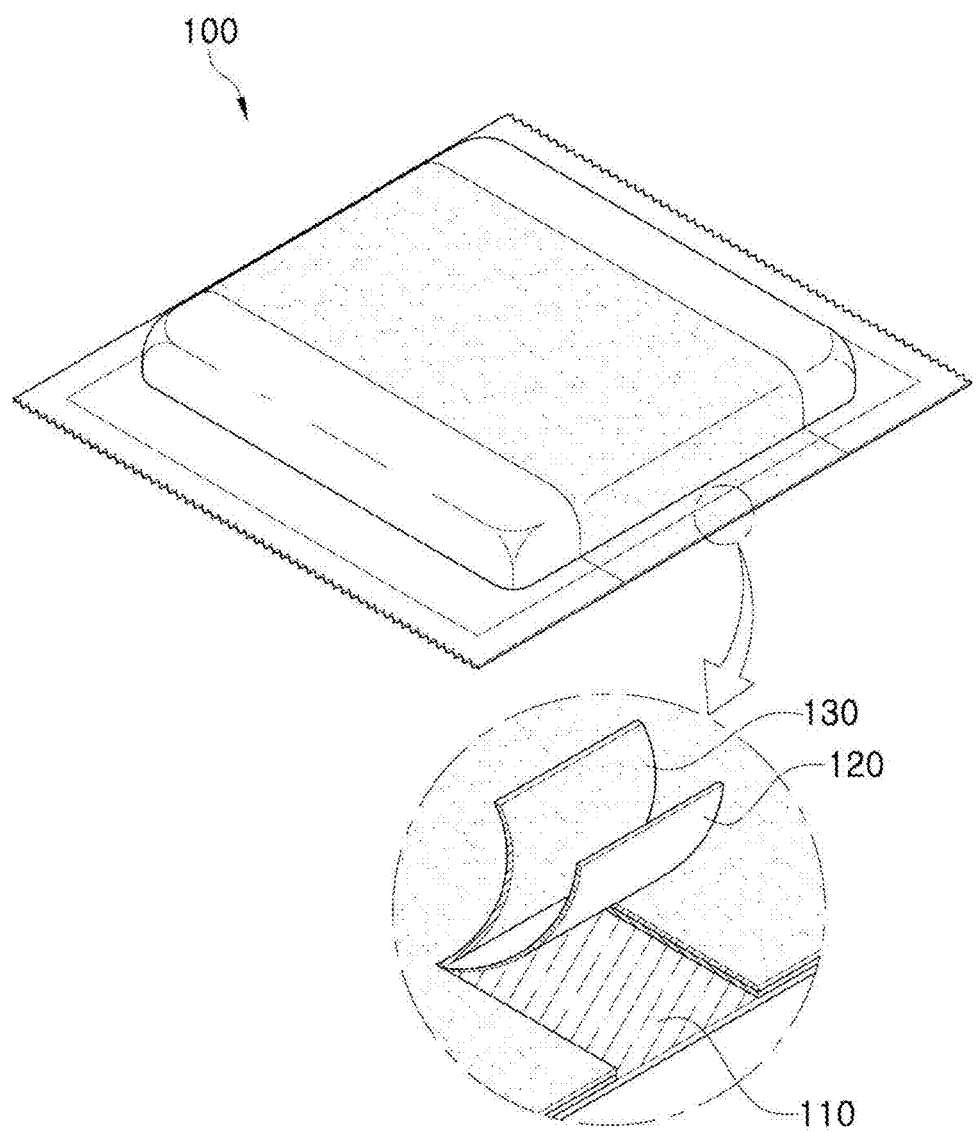
FIG. 3 shows a perspective view of food packing paper which can embody the paper feel of the present invention according to the preparation example 1.
Figure 4:
FIG. 4 is a photograph of food packing paper which can embody the paper feel of the present invention according to the preparation example 1.

The produced food packing paper embodying the paper feel has the laminated structure as represented in FIG. 3, and it can be ascertained from FIG. 4 that, like a real photograph of food packing paper embodying the paper feel according to the present invention as shown, the food packing paper embodying the paper feel wherein the coating composition for food packing paper is applied has a matte effect and paper-like feel. Also, upon comparing the gloss and roughness of the present invention with a real paper, the results as represented in the below Table could be obtained.

EXPLANATION OF REFERENCE NUMERAL

100: Food packing paper which can embody the paper feel of the present invention
110, 211, 231: Substrate layer
120, 232: Printing layer
130: Coating layer
210: Paper/plastic film laminate
212: Adhesive layer
213: Paper layer
220: Parchment paper
230: Food packing paper coated with a matte coating liquid
233: Matte coating layer While the present invention has been described with reference to the particular illustrative embodiments, it is not to be restricted by the embodiment but only by the appended claims. It is to be appreciated that those skilled in the art can change or modify the embodiments without departing from the scope and spirit of the present invention.

The invention claimed is:

1. A coating composition capable of embodying paper feel for food packing paper comprising
   a resin mixture comprising vinyl chloride-vinyl alcohol-vinyl acetate copolymer, polyvinyl butyral, acrylic polymer, polyurethane, rosin-modified maleic acid and polyester polyol;
   an additive; and
   a solvent,
   wherein the said additive comprises 3 to 12% by weight of polyethylene-based wax.

2. The coating composition according to claim 1, wherein the resin mixture is contained in an amount of 19.5 to 38% by weight, based on the total weight of the coating composition.

3. The coating composition according to claim 1, wherein the resin mixture comprises 1 to 3% by weight of polyvinyl butyral, 1 to 5% by weight of vinyl chloride-vinyl alcohol-vinyl acetate copolymer, 1 to 3% by weight of acrylic polymer, 15 to 20% by weight of polyurethane, 1 to 5% by weight of rosin-modified maleic acid and 0.5 to 2% by weight of polyester polyol, based on the total weight of coating composition.

4. The coating composition according to claim 1, wherein the additive is contained in an amount of 4.9 to 19.5% by weight, based on the total weight of coating composition.

5. The coating composition according to claim 1, wherein the additive comprises a polyethylene wax, a polytetrafluoroethylene wax, a silica gel, chlorinated polypropylene, an anti-precipitating agent, and an anti-foaming agent.

6. The coating composition according to claim 5, wherein the additive comprises 1 to 4% by weight of a polyethylene wax, 2 to 8% by weight of a polytetrafluoroethylene wax, 1 to 5% by weight of a silica gel, 0.5 to 1% by weight of chlorinated polypropylene, 0.2 to 0.5% by weight of an anti-precipitating agent, and 0.2 to 1% by weight of an anti-foaming agent.

7. The coating composition according to claim 1, wherein the solvent is contained in an amount of 43 to 75% by weight, based on the total weight of the coating composition.

8. The coating composition according to claim 1, wherein the solvent comprises methyl ethyl ketone, ethyl acetate, isopropyl alcohol and propylene glycol methyl ether.

9. The coating composition according to claim 8, wherein the said solvent comprises 15 to 30% by weight of methyl ethyl ketone, 20 to 33% by weight of ethyl acetate, 5 to 7% by weight of isopropyl alcohol and 3 to 5% by weight of propylene glycol methyl ether.

10. The coating composition according to claim 1, wherein the coating composition has a viscosity of 180 to 250 centistokes.

\* \* \* \* \*